(12) United States Patent
Nakao

(10) Patent No.: US 10,719,279 B2
(45) Date of Patent: Jul. 21, 2020

(54) IMAGE FORMING SYSTEM THAT SWITCHES FROM POWER SAVING STATE TO DRIVING STATE, AND IMAGE FORMING APPARATUS CONTROLLING METHOD

(71) Applicant: KYOCERA Document Solutions Inc., Osaka (JP)

(72) Inventor: Masahiro Nakao, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/363,174

(22) Filed: Mar. 25, 2019

(65) Prior Publication Data
US 2019/0303061 A1    Oct. 3, 2019

(30) Foreign Application Priority Data
Mar. 30, 2018    (JP) ................... 2018-069877

(51) Int. Cl.
| G06F 15/00 | (2006.01) |
| G06F 3/12  | (2006.01) |
| G06K 1/00  | (2006.01) |
| G03G 15/20 | (2006.01) |
| H04N 1/00  | (2006.01) |

(52) U.S. Cl.
CPC ....... *G06F 3/1221* (2013.01); *G03G 15/2039* (2013.01); *G06F 3/1219* (2013.01); *G06F 3/1224* (2013.01); *H04N 1/00896* (2013.01); *G06F 3/1288* (2013.01)

(58) Field of Classification Search
CPC .... G06F 3/1221; G06F 3/1219; G06F 3/1288; G03G 15/2039; H04N 1/00896
USPC .............................. 358/1.1, 1.15, 1.13, 1.14
See application file for complete search history.

(56) References Cited

U.S. PATENT DOCUMENTS

| 6,580,806 B1 * | 6/2003 | Sato ...................... G06T 1/0021 |
| | | 380/277 |
| 2008/0018919 A1 * | 1/2008 | Ohkawa ................... G06T 7/13 |
| | | 358/1.9 |

FOREIGN PATENT DOCUMENTS

JP    2010-102494 A    5/2010

* cited by examiner

*Primary Examiner* — Douglas Q Tran
(74) *Attorney, Agent, or Firm* — IP Business Solutions, LLC

(57) ABSTRACT

An image forming system includes an image forming apparatus, a server, and a terminal device, all of which perform data communication with each other via a network. In the image forming apparatus, when a third communication unit receives input information written into a format, a third controller obtains on a basis of the input information written into the format an available capacity that can further write the input information into the format, compares the available capacity with a preset threshold value, and switches the image forming apparatus from a power saving state to a driving state on a basis of a comparison result.

8 Claims, 6 Drawing Sheets

IMAGE FORMING SYSTEM THAT SWITCHES FROM POWER SAVING STATE TO DRIVING STATE, AND IMAGE FORMING APPARATUS CONTROLLING METHOD

INCORPORATION BY REFERENCE

This application claims priority to Japanese Patent Application No. 2018-069877 filed on 30 Mar. 2018, the entire contents of which are incorporated by reference herein.

BACKGROUND

The present disclosure relates to image forming systems including image forming apparatuses, servers, and terminal devices, all of which perform data communication with each other via networks, and to image forming apparatus controlling methods. The present disclosure particularly relates to a technique for switching an image forming apparatus from a power saving state to a driving state.

In the image forming systems, there are known techniques in which printing requests of images are transmitted from terminal devices to image forming apparatuses via networks and the images are formed on recording sheets by the image forming apparatuses. When power saving states are set in the image forming apparatuses, switching from the power saving states to driving states is performed in response to the reception of the printing requests, and image formations are started after temperatures of fixing devices rise to fixing temperatures. Therefore, waiting times occur between the receptions of the printing requests and the starting of image formations.

In view of the foregoing, there are known systems in which history of print jobs are saved and dates and times of the use of printing terminals are predicted based on the history of the print jobs: in this systems, the printing terminals are switched from the power saving states to the driving states on the predicted use dates and times, to thereby start printing.

SUMMARY

A technique improved over the above technique is proposed herein as one aspect of the present disclosure.

An image forming apparatus according to an aspect of the present disclosure includes an image forming apparatus, a server, and a terminal device, all of which perform data communication with each other via a network. The terminal device includes an operation unit, a first communication unit, and a first controller. The operation unit is operated by a user for a purpose of writing input information into a prescribed format. The first communication unit performs data communication with the server. The first controller causes the first communication unit to transmit the input information written into the format to the server. The server includes a second communication unit and a second controller. The second communication unit performs data communication with the terminal device and the image forming apparatus. When the second communication unit receives the input information written into the format, the second controller causes the second communication unit to transmit the input information written into the format to the image forming apparatus. The image forming apparatus includes a third communication unit and a third controller. The third communication unit performs data communication with the server. When the third communication unit receives the input information written into the format, the third controller obtains on a basis of the input information written into the format an available capacity that can further write the input information into the format, compares the available capacity with a preset threshold value, and switches the image forming apparatus from a power saving state to a driving state on a basis of a comparison result.

An image forming apparatus controlling method according to another aspect of the present disclosure is a controlling method of an image forming apparatus that is to be switched from a power saving state to a driving state, and includes: writing input information into a prescribed format in accordance with an operation of an operation unit performed by a user; calculating on a basis of the input information written into the format an available capacity that can further write the input information into the format; and comparing the available capacity with a preset threshold value, and switching the image forming apparatus from a power saving state to a driving state on a basis of a comparison result.

An image forming system according to still another aspect of the present disclosure includes an image forming apparatus and a terminal device, both of which perform data communication with each other via a network. The terminal device includes an operation unit, a first communication unit, and a first controller. The operation unit is operated by a user for a purpose of writing input information into a prescribed format. The first communication unit performs data communication with the image forming apparatus. The first controller causes the first communication unit to transmit the input information written into the format to the image forming apparatus. The image forming apparatus includes a third communication unit and a third controller. The third communication unit performs data communication with the terminal device. When the third communication unit receives the input information written into the format, the third controller obtains on a basis of the input information written into the format an available capacity that can further write the input information into the format, compares the available capacity with a preset threshold value, and switches the image forming apparatus from a power saving state to a driving state on a basis of a comparison result.

DETAILED DESCRIPTION

Hereinafter, a description will be given of an image forming system according to an embodiment of the present disclosure with reference to the drawings.

Figure 1:
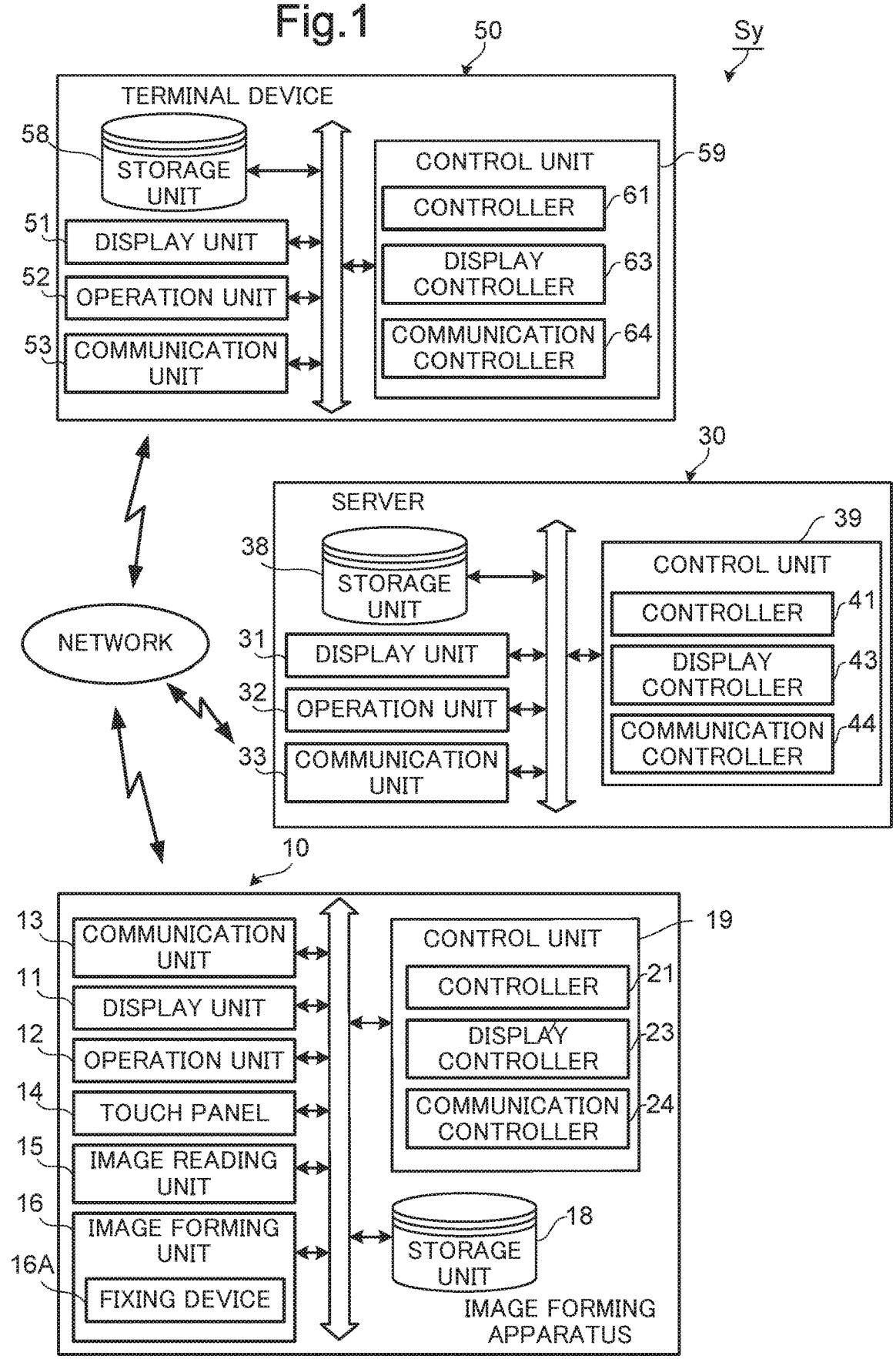
FIG. 1 is a block diagram showing each configuration of an image forming apparatus, a server, and a terminal device of an image forming system according to one embodiment of the present disclosure.

FIG. 1 is a block diagram showing the image forming system according to one embodiment of the present disclosure. The image forming system Sy of the present embodiment includes an image forming apparatus 10, a server 30, and a terminal device 50, all of which are connected with each other via a network.

In this image forming system Sy, the image forming apparatus 10 includes a display unit 11, an operation unit 12, a communication unit 13, a touch panel 14, an image reading unit 15, an image forming unit 16, a storage unit 18, and a control unit 19. These constituent elements are configured to transmit and receive data or signals to and from each other, via a bus.

The display unit 11 is constituted of, for example, a liquid crystal display (LCD) or an organic light-emitting diode (OLED) display. The operation unit 12 includes hard keys such as a numeric keypad, a determination key, and a start key.

A screen of the display unit 11 is provided with the touch panel 14. The touch panel 14 is a touch panel of, for example, a so-called resistive film type or electrostatic capacity type, and detects contact (touch) on the touch panel 14 made by a user's finger together with a position of this contact. Upon the contact of the finger, the touch panel 14 outputs a detection signal indicating coordinates of the position of the aforementioned contact, for example, to a controller 21 (to be described later on) of the control unit 19.

The communication unit 13 is a communication interface including a communication module such as a LAN (Local Area Network) chip. The communication unit 13 is connected to, for example, the server 30 or the terminal device 50 via the network, and transmits and receives data to and from the server 30 or the terminal device 50.

The image reading unit 15 includes a scanner that optically reads an original document placed on a contact glass. The image reading unit 15 forms image data of an image of the original document.

The image forming unit 16 includes for example: a photoconductor drum; a charging device that uniformly charges a surface of the photoconductor drum; an exposure device that exposes the surface of the photoconductor drum to form an electrostatic latent image on the surface of the photoconductor drum; a developing device that develops the electrostatic latent image formed on the surface of the photoconductor drum into a toner image; and a transfer device that transfers the toner image (image) on the surface of the photoconductor drum to a recording sheet. The image forming unit 26 forms an image of the image data onto the recording sheet.

The image forming unit 16 further includes a fixing device 16A. The fixing device 16A applies heat and pressure at a fixing temperature on a recording sheet having the toner image formed on its surface, and thereby fixes the toner image on the recording sheet.

The storage unit 18 is a large-capacity storage device, such as an SSD (Solid State Drive) or an HDD (Hard Disk Drive), and stores various kinds of application programs, information, and the like.

The control unit 19 includes, for example, a processor, a RAM (Random Access Memory), and a ROM (Read Only Memory). The processor is, for example, a CPU (Central Processing Unit), an MPU (Micro Processing Unit), or an ASIC (Application Specific Integrated Circuit). When a control program stored in the ROM or the storage unit 18 is executed by the processor, the control unit 19 acts as the controller 21, the display controller 23, and the communication controller 24. The controller 21, the display controller 23, and the communication controller 24 are examples of the third controller recited in the scope of claims.

The control unit 19 is connected to, for example, the display unit 11, the operation unit 12, the communication unit 13, the touch panel 14, the image reading unit 15, the image forming unit 16, and the storage unit 18. The control unit 19 performs operation control of these constituent elements and transmits and receives signals and data among each of the constituent elements.

The controller 21 collectively controls the image forming apparatus 10. The controller 21 serves a role as a processing unit that performs various processing required for image formation by the image forming apparatus 10. The display controller 23 has a function of controlling a display operation of the display unit 11. The communication controller 24 has a function of controlling a communication operation of the communication unit 13.

In the image forming system Sy, the server 30, for example, is a work station and includes a display unit 31, an operation unit 32, a communication unit 33, a storage unit 38, and a control unit 39. These constituent elements are configured to transmit and receive data or signals to and from each other, via a bus.

The display unit 31 is constituted of, for example, the LCD or the OLED display.

The operation unit 32 is a keyboard and a pointing device that are operated by the user.

The communication unit 33 is a communication interface and is connected to, for example, the image forming apparatus 10 or the terminal device 50 via the network, and transmits and receives data to and from the image forming apparatus 10 or the terminal device 50.

The storage unit 38 is a large-capacity storage device, such as the SSD or the HDD, and stores various kinds of application programs, information, and the like.

The control unit 39 includes, for example, the processor, the RAM, and the ROM. The processor is, for example, the CPU, the MPU, or the ASIC. When a control program stored in the ROM or the storage unit 38 is executed by the processor, the control unit 39 acts as a controller 41, a display controller 43, and a communication controller 44. These constituent elements of the control unit 39, however, may each be configured by a hardware circuit, instead of acting in accordance with the control program. The controller 41, the display controller 43, and the communication controller 44 are one example of the second controller recited in the scope of claims.

The control unit 39 is connected to, for example, the display unit 31, the operation unit 32, the communication unit 33, and the storage unit 38, and performs operation control of these constituent elements and transmits and receives signals and data among each of the constituent elements.

The controller 41 collectively controls the server 30. The controller 41 serves a role as a processing unit that executes processing in accordance with operations of the operation unit 32. The display controller 43 has a function of controlling a display operation of the display unit 31. The communication controller 44 has a function of controlling a communication operation of the communication unit 33.

In the image forming system Sy, the terminal device 50 is a well-known personal computer (PC), and includes a display unit 51, an operation unit 52, a communication unit 53, a storage unit 58, and a control unit 59. These constituent elements are configured to transmit and receive data or signals to and from each other, via a bus.

The display unit 51 is constituted of, for example, the LCD or the OLED display.

The operation unit 52 is a keyboard and a pointing device that are operated by the user.

The communication unit 53 is a communication interface and is connected to, for example, the image forming apparatus 10 or the server 30 via the network, and transmits and receives data to and from the image forming apparatus 10 or the server 30.

The storage unit 58 is a large-capacity storage device, such as the SSD or the HDD, and stores various kinds of application programs, information, and the like.

the control unit 59 includes, for example, the processor, the RAM, and the ROM. The processor is, for example, the CPU, the MPU, or the ASIC. When a control program stored in the ROM or the storage unit 58 is executed by the processor, the control unit 59 acts as a controller 61, a display controller 63, and a communication controller 64. These constituent elements of the control unit 59, however, may each be configured by a hardware circuit, instead of acting in accordance with the control program. The controller 61, the display controller 63, and the communication controller 64 are one example of the third controller recited in the scope of claims.

The control unit 59 is connected to, for example, the display unit 51, the operation unit 52, the communication unit 53, and the storage unit 58, and performs operation control of these constituent elements and transmits and receives signals and data among each of the constituent elements.

The controller 61 collectively controls the terminal device 50. The controller 61 serves a role as a processing unit that executes processing in accordance with operations of the operation unit 52. The display controller 63 has a function of controlling a display operation of the display unit 51. The communication controller 64 has a function of controlling a communication operation of the communication unit 53.

Drive control of printing executed in the image forming apparatus 10 will be described hereunder. In the image forming apparatus 10, if the image forming unit 16 does not perform image forming processing for a certain period of time, the controller 21 sets the image forming unit 16 to the power saving state, and performs control of lowering a temperature of the fixing device 16A of the image forming unit 16. As in a conventional manner, in a case of switching the image forming unit 16 from the power saving state to the driving state at a timing when printing is requested, it is necessary to wait until the temperature of the fixing device 16A rises to the fixing temperature and a waiting time occurs from the time the print request is made until the start of image formation.

In the present embodiment, by controlling the timing of switching from the power saving state to the driving state in accordance with situations where the input information is written into a prescribed format in the terminal device 50 side, the waiting time at the image forming apparatus 10 can be shortened.

To be specific, in the terminal device 50, when the user is operating the operation unit 52 and writing input information into the format, the controller 61 controls and causes the communication controller 64 to transmit the input information written into the format from the communication unit 53 through the network to the server 30 at a prescribed cycle. In the server 30, the input information written into the format is received at the communication unit 33, and the input information written into the format is stored in the storage unit 38.

In the server 30, when the communication unit 33 receives transmitting requests that are transmitted at each predefined cycle from the terminal device 50, the controller 41 controls and causes the communication controller 44 to transmit the input information written into the format from the communication unit 33 via the network to the image forming apparatus 10. In the image forming apparatus 10, when the communication unit 13 receives the input information written into the format, the controller 21 obtains on a basis of the input information written into the format an available capacity that can further write the input information into the format. When the available capacity becomes below a preset threshold value, for example, the format becomes a state of being almost filled up with the input information, even if the printing request by a print job has not been received, the controller 21 switches the image forming unit 16 from the power saving state to the driving state.

Thereafter, upon finishing the writing of the input information into the format in the terminal device 50, the controller 61 controls and causes the communication controller 64 to transmit the input information written into the format from the communication unit 53 to the server 30 via the network together with the printing request. The input information written into the format and the printing request are transmitted through the server 30 to the image forming apparatus 10. When the communication unit 13 receives the input information written into the format together with the printing request in the image forming apparatus 10, the controller 21 responds to the printing request and causes the image forming unit 16 to form the input information written into the format as an image on the recording sheet.

In other words, when the format is almost filled up with input information, the image forming unit 16 is switched from the power saving state to the driving state. When the input information written into the format the writing of which is finished thereafter, is transmitted together with the printing request from the terminal device 50 through the server 30 to the image forming apparatus 10 and the image forming apparatus 10 receives them, the image forming apparatus 10 having already been in the driving state immediately forms an image of the input information written into the format on the recording sheet. This configuration can shorten the waiting time in the image forming apparatus 10. In addition, since the switching from the power saving state to the driving state can be performed at appropriate timing, the effect of power saving is not impaired.

Figure 2:
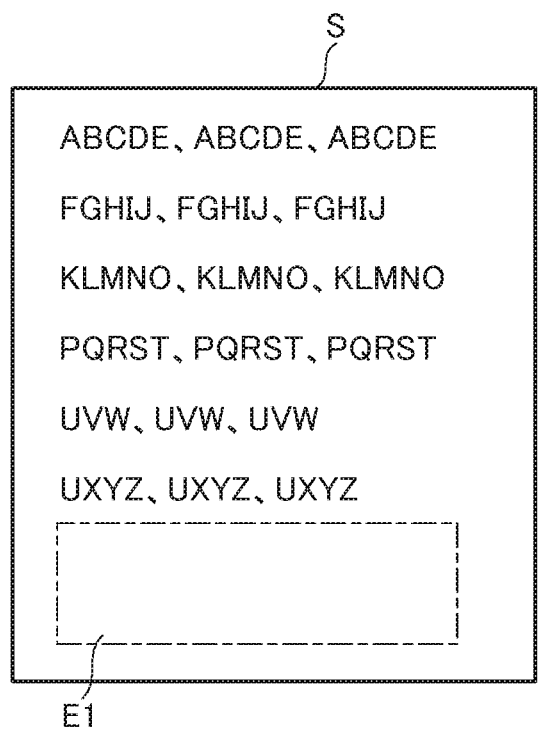
FIG. 2 is a diagram showing a page of a prescribed format.

The aforesaid format is, for example, a document S formed of data having the prescribed format as shown in FIG. 2. Characters, diagrams, and the like are written and inputted into the document S by applications such as text editor of word processor. The amount of characters, diagrams, and the like that can be written into the document S is limited to a predefined writable amount. In this case, the input information written into the format is the characters, diagrams, and the like that are to be written into the document S, and an available capacity that can further write the input information into the document S is a blank space amount E1 of the document S. The blank space amount E1 of the document S is 100% before the characters, diagrams, and the like are written (i.e., a blank state), and decreases as the number of the characters, diagrams, and the like written into the document S increases. When the document S is filled up with the characters, diagrams, and the like, the blank space amount E1 becomes 0%.

In the image forming apparatus 10, when the communication unit 13 receives the input information written into the document S (format) shown in FIG. 2, the controller 21 obtains, on the basis of the input information such as the characters, diagrams, and the like written into the document S, the blank space amount E1 of the document S, compares the blank space amount E1 of the document S with a preset first threshold value (e.g., 10%). When the blank space amount E1 of the document S becomes below the first threshold value, in other words, when the document S becomes the state of being almost filled up with the characters, diagrams, and the like, the controller 21 switches the image forming unit 16 from the power saving state to the driving state. Thereafter, in the image forming apparatus 10, when the communication unit 13 receives, together with the printing request, the document S into which characters, diagrams, and the like are written, the controller 21 responds to the printing request and causes the image forming unit 16 to form the characters, diagrams, and the like written into the document S as an image on the recording sheet.

Figure 3:
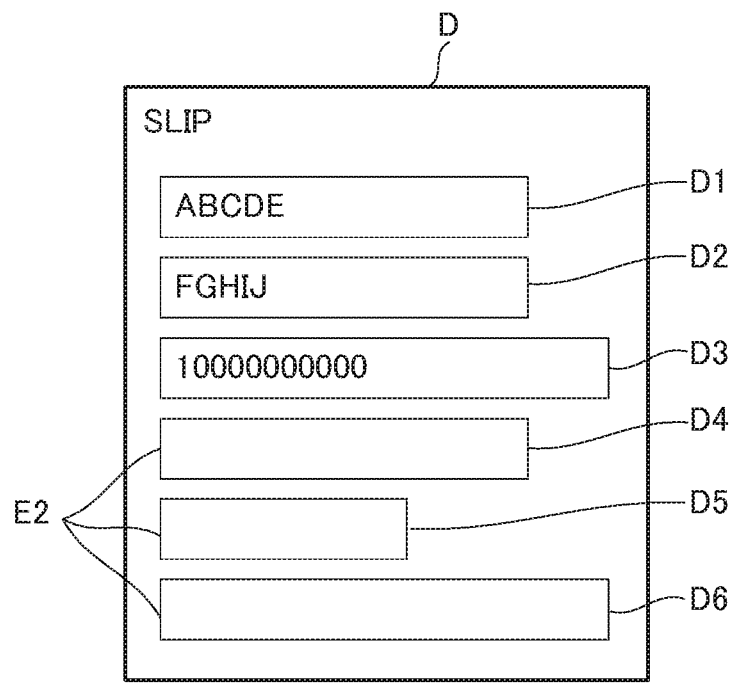
FIG. 3 is a diagram showing a slip having a prescribed format.

Alternatively, the aforesaid format is, for example, a document D having a slip format set in advance (hereinafter referred to as slip D) as shown in FIG. 3. On the slip D, a plurality of entry columns D1 to D6 into which characters and the like are to be written is set. In this case, the input information written into the format is the characters and the like that are to be written into each of the entry columns D1 to D6 on the slip D. The available capacity that can further write the input information into the format is an (input information) unchanged amount E2 in each of the entry columns D1 to D6. The unchanged amount E2 is 100% when all the entry columns D1 to D6 are bank, and decreases as the number of the entry columns into which the characters and the like are written increases. When the characters and the like are written into all the entry columns D1 to D6, the unchanged amount E2 becomes 0%. In the image forming apparatus 10, when the communication unit 13 receives the slip D shown in FIG. 3 as the input information written into the format, the controller 21 obtains the unchanged amount E2 of the slip D on the basis of the characters and the like written into each of the entry columns D1 to D6 of the slip D and compares the unchanged amount E2 of the slip D with a present second threshold value (e.g., 10%). When the unchanged amount E2 of the slip D becomes below the second threshold value, that is, for example, when most of the entry columns D1 to D6 of the slip D become a state of being filled up with the characters and the like, the controller 21 switches the image forming unit 16 from the power saving state to the driving state. Thereafter, in the image forming apparatus 10, when the communication unit 13 receives, together with the printing request, the slip D into which characters and the like are entered into the entry column, the controller 21 responds to the printing request and causes the image forming unit 16 to form the slip D as an image on the recording sheet.

Next, the processing procedures of switching the image forming unit 16 from the power saving state to the driving state as described above will be further detailed with reference to a flowchart shown in FIG. 4.

Figure 4:
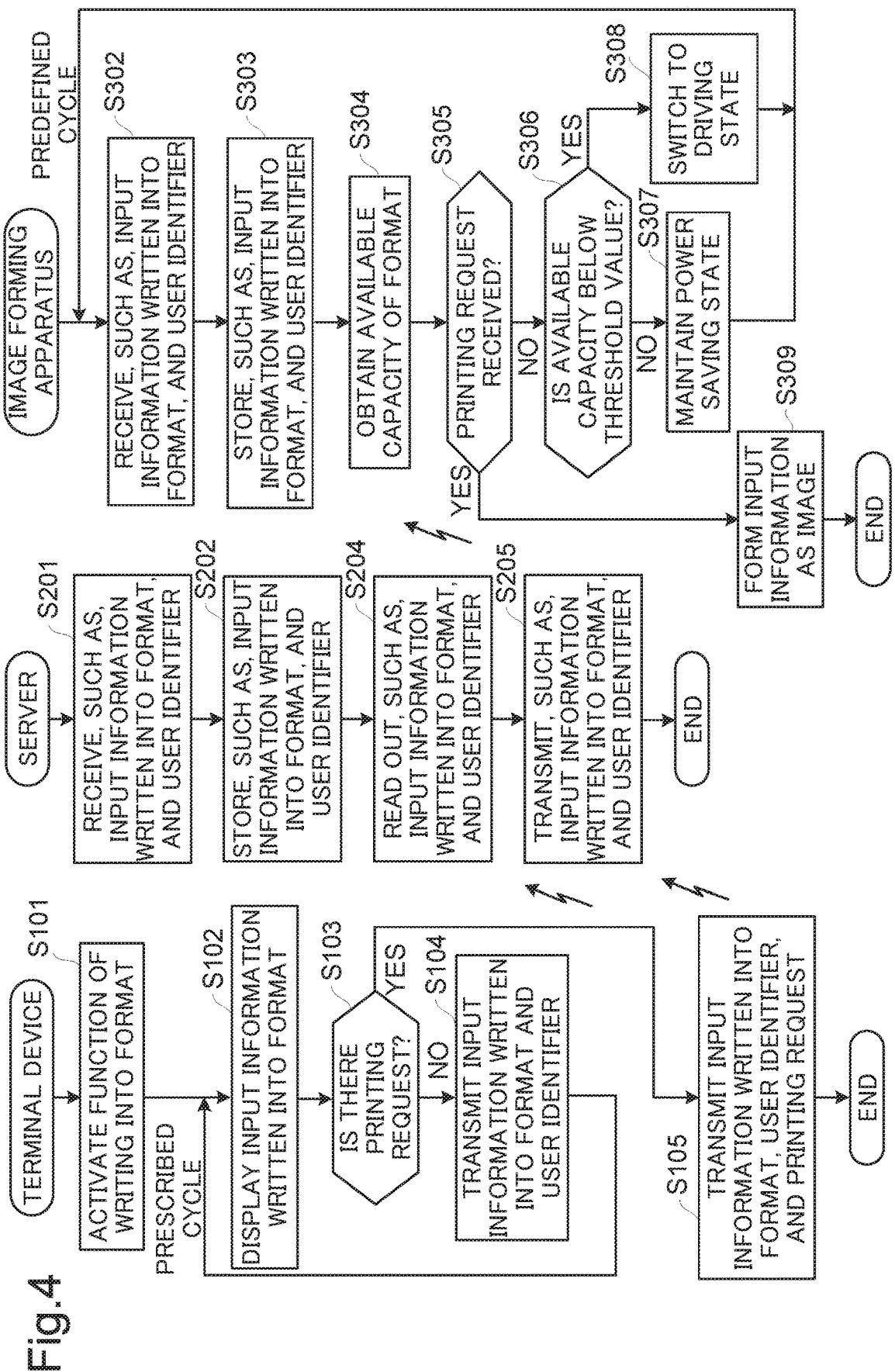
FIG. 4 is a flowchart showing an operation procedure of switching the image forming apparatus from a power saving state to a driving state.

Firstly, in the terminal device 50, when the user operates the operation unit 52 and activates a writing function (the aforesaid application) that is a function of writing the input information into the document S shown in FIG. 2 or the slip D shown in FIG. 4, the display controller 63 causes the display unit 51 to display the document S or the slip D on the screen thereof (step S101). When the user operates the operation unit 52 and inputs the input information, the display controller 63 causes the input information to be displayed within the document S or the slip D displayed on the screen of the display unit 51 (step S102).

Upon such writing of the input information into the document S or the slip D by the user, the controller 61 determines whether the user has operated the operation unit 52 and instructed the printing request (step S103), and when the printing request has not been instructed ("NO" in step S103), the communication controller 64 causes, at a predetermined cycle, the communication unit 53 to transmit the document S or the slip D, into which the input information is written, to the server 30 via the network together with a preset user identifier ID (identification) (step S104). The preset user identifier ID is used to identify the user who has written the input information.

In the server 30, when the communication unit 33 receives the document S or the slip D into which the input information is written, and the user identifier ID (step S201), the controller 41 causes the document S or the slip D to be stored in a predetermined folder within the storage unit 38 in association with the user identifier ID (step S202). At this point, the transmission of the document S or the slip D and the user identifier ID from the terminal device 50 to the server 30 is repeated in the aforesaid predetermined cycle. Thus, the document S or the slip D stored in the folder is updated each time the transmission repeats. The folder is a dedicated folder having been set beforehand to store the document S or the slip D.

In the server 30, at a cycle having been set in advance, the controller 41 reads out from the folder within the storage unit 38 the document S or the slip D into which the input information is written, and the user identifier ID (step S204), and the communication controller 44 causes the communication unit 33 to transmit the document S or the slip D, and the user identifier ID to the image forming apparatus 10 via the network (step S205).

In the image forming apparatus 10, when the communication unit 13 receives the document S or the slip D into which the input information is written, and the user identifier ID (step S302), the controller 21 causes the document S or the slip D to be stored in the storage unit 18 in association with the user identifier ID (step S303), and calculates the blank space amount E1 of the document S or calculates the unchanged amount E2 of the slip D (step S304).

Then the controller 21 determines whether, other than the document S or the slip D and the user identifier ID, the printing request has been received (step S305). The process proceeds to the next step S306 when the printing request has not been received ("NO" in step S305).

The controller 21, for example, compares the blank space amount E1 of the document S with the preset first threshold value (step S306), and when the blank space amount E1 of the document S is equal to or over the first threshold value ("NO" in step S306), maintains the power saving state of the image forming unit 16 (step S307), then returns to the step S302. When the blank space amount E1 of the document S becomes below the first threshold value ("YES" in step S306), the controller 21 switches the image forming unit 16 from the power saving state to the driving state, and raises the temperature of the fixing device 16A to the fixing temperature (step S308).

Alternatively, the controller 21 compares the unchanged amount E2 of the slip D with the preset second threshold value (step S306), and when the unchanged amount E2 of the slip D is equal to or over the second threshold value ("NO" in step S306), maintains the power saving state of the image forming unit 16 (step S307), then returns to the step S302. When the unchanged amount E2 of the slip D becomes below the second threshold value ("YES" in step S306), the controller 21 switches the image forming unit 16 from the power saving state to the driving state, and raises the temperature of the fixing device 16A to the fixing temperature (step S308).

Here, since the document S or the slip D is transmitted at a preset cycle from the server 30 to the image forming apparatus 10, the document S or the slip D is repeatedly received at the communication unit 13 of the image forming apparatus 10 (step S302), the document S or the slip D is either stored in the storage unit 18 or updated (step S303). Every storing or updating, the controller 21 calculates the blank space amount E1 of the document S or the unchanged amount E2 of the slip D (step S304), and when the printing request has not been received ("NO" in step S305), compares the blank space amount E1 of the document S with the first threshold value, or, compares the unchanged amount E2 of the slip D with the second threshold value (step S306). On the basis of the comparison result ("YES" or "NO" in step S306), the controller 21 maintains the power saving state of the image forming unit 16 (step S307) or switches the image forming unit 16 from the power saving state to the driving state, and raises the temperature of the fixing device 16A to the fixing temperature (step S308). Then, the process returns to the step S302.

Thereafter, in the terminal device 50, upon finishing the writing of the input information into the document S or the slip D, the user operates the operation unit 52 and input the printing request. When the printing request is inputted ("YES" in step S103), the communication controller 64 causes the communication unit 53 to transmit the document S or the slip D into which the input information is written, and the user identifier ID to the server 30 via the network together with the printing request (step S105).

in the server 30, when the communication unit 33 receives the document S or the slip D into which the input information is written, the user identifier ID, and the printing request (step S201), the controller 41 causes the document S or the slip D, the user identifier ID, and the printing request to be stored in the predetermined folder within the storage unit 38 in association with each other (step S202). Then the controller 41 reads out the document S or the slip D, the user identifier ID, and the printing request from the folder within the storage unit 38 (step S204), and the communication controller 44 causes the communication unit 33 to transmit the document S or the slip D, the user identifier ID, and the printing request to the image forming apparatus 10 via the network (step S205).

In the image forming apparatus 10, when the communication unit 13 receives the document S or the slip D into which the input information is written, the user identifier ID, and the printing request (step S302), the controller 21 causes the document S or the slip D, and the user identifier ID to be stored in the storage unit 18 to be updated (step S303), and calculates the blank space amount E1 of the document S or calculates the unchanged amount E2 of the slip D (step S304). At this time, since the printing request is being received ("YES" in step S305), the controller 21 reads out the document S or the slip D into which the input information is written, and the user identifier ID from the storage unit 18, and causes the image forming unit 16 to form the document or the slip D as an image on the recording sheet (step S309).

If, before the available capacity of the format becomes below the preset threshold value, the input information written into the format is transmitted from the terminal device 50 to the image forming apparatus 10 through the server 30 together with the printing request, the controller 21 of the image forming apparatus 10 responds to the printing request ("YES" in step S305), and switches the image forming unit 16 from the power saving state to the driving state. Then, after the temperature of the fixing device 16A reaches the fixing temperature, the controller 21 causes the image forming unit 16 to form the format as an image on the recording sheet (step S309).

As in a kwon system, in a case of predicting a date and time of use on the basis of print job history, and switching a printing terminal from the power saving state to the driving state on the date and time of use, since the printing terminal is not necessarily used as predicted, the printing terminal is switched to the driving state useless. Thus, there is a possibility that unnecessary power consumption increases.

On the other hand, in the present embodiment, when writing the input information into the format in the terminal device 50, the input information written into the format is transmitted from the terminal device 50 through the server 30 to the image forming apparatus 10. In the image forming apparatus 10, every time the input information written into the format is received, the determination of whether the available capacity of the format has become below the preset threshold value or not is performed, and when the available capacity of the format becomes below the preset threshold value, for example, when the format becomes a state of being almost filled up with the input information, the image forming unit 16 is switched from the power saving state to the driving state. Thereafter, upon finishing the writing of the input information into the format in the terminal device 50 and when the input information written into the format is transmitted from the terminal device 50 through the server 30 to the image forming apparatus 10 together with the printing request, in the image forming apparatus 10, the input information written into the format is formed as an image on the recording sheet in response to the printing request.

Thus, in the image forming apparatus 10, since the image forming unit 16 is switched from the power saving state to the driving state and the temperature of the fixing device 16A is raised to the fixing temperature before the reception of the printing request, it is possible to promptly form the input information written into the format as an image on the recording sheet upon reception of the printing request, while striving to conserve power as much as possible, As described thus far, the above embodiment is capable of more precisely predicting the timing at which the image forming apparatus 10 is used, and switching the image forming apparatus 10 from the power saving state to the driving state.

Figure 5:
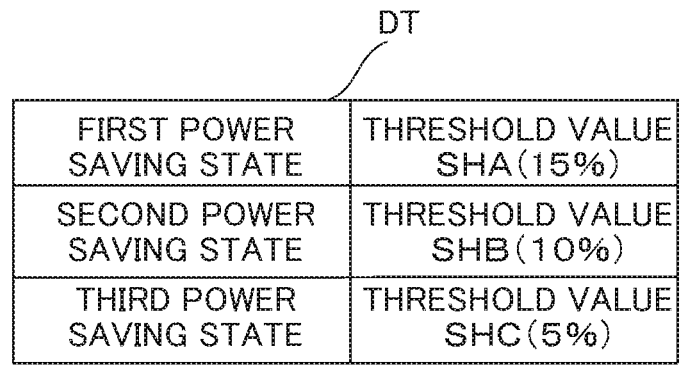
FIG. 5 is a diagram showing a data table in which first to third power saving states to be switched stepwise are stored in association with respective threshold values.

In the above embodiment, the image forming apparatus 10 performs the switching between the power saving state and the driving state. In the power saving state, a standby temperature of the fixing device 16A can be switched into a plurality of stages. For example, the standby temperature of the fixing device 16A can be switched into the following three stages of temperature: low temperature that is a first temperature below the fixing temperature and is set beforehand; medium temperature that is a second temperature below the fixing temperature and is set beforehand so as to be higher than the first temperature; and high temperature that is a third temperature below the fixing temperature and is set beforehand so as to be higher than the second temperature. In this case, the image forming apparatus 10 is capable of being in the waiting state at the three types of power saving state, which are, a first power saving state corresponding to low temperature, a second power saving state corresponding to medium temperature, and a third power saving state corresponding to high temperature. The threshold values SHA, SHB, and SHCS respectively corresponding to the first power saving state, the second power saving state, and the third power saving state are stored in the data table DT stored in the storage unit 18 of the image forming apparatus 10, as shown in FIG. 5. The data table DT is referenced by the controller 21.

The temperature of the fixing device 16A is maintained at lower temperature under the first power saving state, so that raising the temperature of the fixing device 16A to the fixing temperature takes long time. Thus, it is necessary to quickly perform the switching from the first power saving state to the driving state. For this reason, the threshold value SHA is set at a high value (e.g., 15%).

The temperature of the fixing device 16A is maintained at medium temperature under the second power saving state, so that raising the temperature of the fixing device 16A to the fixing temperature takes shorter time than the first power saving state. Thus, the switching from the second power saving state to the driving state can be slower than the case of the first power saving state. For this reason, the threshold value SHB is set at a lower value (e.g., 10%).

Furthermore, the temperature of the fixing device 16A is maintained at high temperature under the third power saving state, so that raising the temperature of the fixing device 16A to the fixing temperature takes shorter time than the second power saving state. Thus, the switching from the third power saving state to the driving state can be slower than the case of the second power saving state. For this reason, the threshold value SHC is set at a further lower value (e.g., 5%).

In the image forming apparatus 10, in a case where the first power saving state is being set, when the communication unit 13 receives the input information written into the format having been transmitted from the server 30, the controller 21 obtains the available capacity of the format on the basis of the input information written into the format, and when the available capacity becomes below the threshold value SHA corresponding to the first power saving state, switches the image forming unit 16 from the first power saving state to the driving state. At this point, the available capacity of the format still remains near 15%. Therefore, it takes time to finish the writing of the input information into the format, and during that time the temperature of the fixing device 16A can be raised from low temperature to the fixing temperature .

Furthermore, in a case where the second power saving state is being set, when the available capacity of the format becomes below the threshold value SHB corresponding to the second power saving state, the controller 21 switches the image forming unit 16 from the second power saving state to the driving state. At this point, the available capacity of the format still remains near 10%. Therefore, the temperature of the fixing device 16A can be raised from medium temperature to the fixing temperature by the time of finishing the writing the input information into the format.

In a case where the third power saving state is being set, when the available capacity of the format becomes below the threshold value SHC corresponding to the third power saving state, the controller 21 switches the image forming unit 16 from the third power saving state to the driving state. At this point, the available capacity of the format becomes near 5% and low. However, since the temperature of the fixing device 16A is maintained at high temperature, the temperature of the fixing device 16A can be promptly raised to the fixing temperature by the time of finishing the writing the input information into the format.

With the above configurations, in the image forming apparatus 10, whichever one of the first power saving state, the second power saving state, and the third power saving state is being set, the temperature of the fixing device 16A can be raised close to the fixing temperature upon reception of the printing request. Therefore, it is possible to shorten the waiting time. Moreover, because the switching to the driving state from the first power saving state, or the second power saving state or the third power saving state, is performed at each precise timing, the effect of power saving is not impaired.

Figure 6:
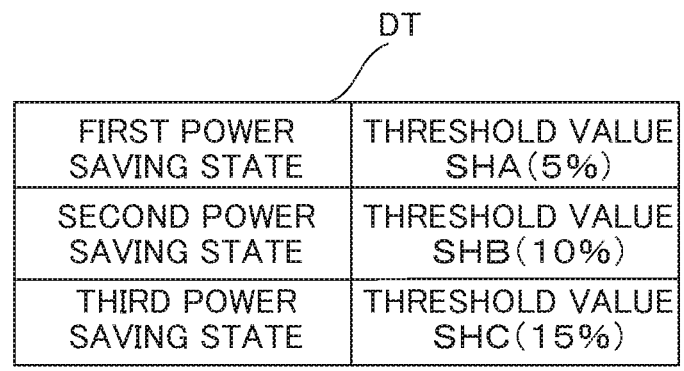
FIG. 6 is a diagram showing another example of the data table in which the first to the third power saving states to be switched stepwise are stored in association with the respective threshold values.

As shown in FIG. 6, the connection among the first power saving state, the second power saving state, the third power saving state, and the preset threshold values may be set so as to be opposite to the relationships shown in FIG. 5. In this case, the control unit 21 does not return the power saving state to the driving state unless more input information is written into the format when the power saving state requiring longer time to return to the drive state from the power saving state is being set. Accordingly, it is possible to make it difficult for the image forming apparatus 10 to return to the driving state when the user desires more power saving while reducing the time until printing becomes possible as much as possible.

Furthermore, in the image forming apparatus 10, the threshold values may be set for each user identifier ID. In that case, the threshold values each corresponding to the respective user identifier ID are stored in the storage unit 18. When the communication unit 13 receives the input information written into the format and the user identifier ID, the controller 21 reads out the threshold value corresponding to the user identifier ID from the storage unit 18, and obtains the available capacity of the format on the basis of the input information written into the format. When the available capacity becomes below the threshold value having been read out, the controller 21 switches the image forming unit 16 from the power saving state to the driving state.

Still further, the controller 21 may be configured so as to correct the threshold value corresponding to the user identifier ID in accordance with the available capacity of the format at the time of receiving the printing request, that is, in accordance with the available capacity of the format at the time of printing the input information written into the format. In that case, when the communication unit 13 receives the input information written into the format, the user identifier ID, and the printing request, the controller 21 obtains the available capacity of the format on the basis of the input information written into the format, and corrects the threshold value on the basis of the available capacity.

For example, when the communication unit 13 receives the input information written into the format, the user identifier ID, and the printing request, when the available capacity of the format is well below the threshold value (for example, when it is smaller than the value obtained by subtracting a preset first value from the threshold value), in order to slow the timing at which the image forming unit 16 is switched from the power saving state to the driving state, a correction is made so that the threshold value becomes smaller.

In addition, when the communication unit 13 receives the input information written into the format, the user identifier ID, and the printing request, when the available capacity of the format is slightly below the threshold value (for example, when the difference from the threshold value is within a preset second value) or when the available capacity of the format is equal to or over the threshold value, in order to speed the timing at which the image forming unit 16 is switched from the power saving state to the driving state, a correction is made so that the threshold value becomes larger.

For example, the above configurations make it possible to appropriately correct the threshold value in accordance with: (i) a user who instructs the printing request after the format is almost filled up with the input information; and (ii) a user who instructs the printing request long before the format fills up with the input information. Therefore, it is possible to precisely adjust the timing at which the image forming unit 16 is switched from the power saving state to the driving state for every user.

The controller 21 may further be configured so as to: obtain the available capacity of the format on the basis of the input information written into the format every time the input information written into the format, the user identifier ID, and the printing request are received at the communication unit 13; cause the available capacity to be stored in the storage unit 18 in association with the user identifier ID; after causing a plurality of available capacities associated with the same user identifier ID to be stored in the storage unit 18, obtain an average value of the respective available capacities, and correct the threshold value on the basis of the average value.

In the above embodiment, the controller 21 switches the image forming unit 16 from the power saving state to the driving state when determining that the blank space amount E1 of the document S is below the first threshold value or the unchanged amount E2 of the slip D is below the second threshold value. In a case, for example, where a format including both the document S and the slip D is used, the controller 21 may be configured to switch the image forming unit 16 from the power saving state to the driving state when determining that the blank space amount E1 is below the first threshold value and also the unchanged amount E2 is below the second threshold value.

The controller 21 may further be configured to validate one of the comparison of the blank space amount E1 with the first threshold value, and the comparison of the unchanged amount E2 with the second threshold value: the controller 21 is configured to invalidate the other comparison in that case.

In the above embodiment, the input information written into the format and the user identifier ID are transmitted from the terminal device 50 to the server 30 at the predetermined cycle. The transmission may be performed at a random timing. The input information written into the format and the user identifier ID are also transmitted from the server 30 to the image forming apparatus 10 at the predetermined cycle. Similarly to the aforesaid case, this transmission may be performed at a random timing.

There may be a case where the input information written into the format, the user identifier ID, and the printing request are transmitted between the terminal device 50 and the image forming apparatus 10 without the server 30 in between. In this case, the terminal device 50 combines the functions of the server 30.

The image forming unit 16 in the above embodiment is configured to form an image on a recording sheet. However, the present invention is not limited to such embodiment. The image forming unit 16 may form an image on other kind of recording medium besides the recording sheet. As other kind of recording medium, for example, an OHP (Overhead Projector) sheet can be exemplified.

Although the descriptions of the above embodiment are given taking a multi-function peripheral as the image forming apparatus according to one embodiment of the present disclosure, it is merely illustrative. The image forming apparatus may be any other image forming apparatuses such as a copier, a printer, and a facsimile machine.

The configuration and processing of the above embodiment described with reference to FIGS. 1 to 6 are merely illustrative of the present disclosure, and the present disclosure is not intended to be limited to the above configuration and processing.

While the present disclosure has been described in detail with reference to the embodiments thereof, it would be apparent to those skilled in the art the various changes and modifications may be made therein within the scope defined by the appended claims.

What is claimed is:

1. An image forming system comprising an image forming apparatus, a server, and a terminal device, all of which perform data communication with each other via a network,
the terminal device comprising:
an operation unit that is operated by a user for a purpose of writing input information into a prescribed format;
a first communication unit that performs data communication with the server; and
a first controller that causes the first communication unit to transmit the input information written into the format to the server together with a user identifier to be used to identify the user who has written the input information,
the server comprising:
a second communication unit that performs data communication with the terminal device and the image forming apparatus; and
a second controller that, when the second communication unit receives the input information written into the format and the user identifier, causes the second communication unit to transmit the input information written into the format and the user identifier to the image forming apparatus, and
the image forming apparatus comprising:
a third communication unit that performs data communication with the server;
an image forming unit that forms an image on a recording medium;
a storage unit that stores at least one threshold value that is set beforehand for each user identifier; and
a third controller that, when the third communication unit receives the input information written into the format and the user identifier, reads out a threshold value corresponding to the received user identifier from the storage unit, obtains on a basis of the input information written into the format an available capacity that can further write the input information into the format, compares the available capacity with the read out threshold value, and switches the image forming unit from a power saving state to a driving state when the available capacity becomes below the threshold value.

2. The image forming system according to claim 1, wherein the third controller calculates, as the available capacity, an amount of blank space on which no information is being written into the format.

3. The image forming system according to claim 1, wherein
after switching the image forming unit from the power saving state to the driving state, when a printing request transmitted from the terminal device through the server is received at the third communication unit, the third controller causes the image forming unit to start forming an image including the input information written into the format.

4. The image forming system according to claim 3, wherein the third controller obtains the available capacity of the format of a time point of receiving the printing request, and corrects the threshold value on a basis of the available capacity.

5. The image forming system according to claim 3, wherein the third controller obtains the available capacity of the format every reception of the printing request, and corrects the threshold value on a basis of an average value of a plurality of available capacities.

6. The image forming system according to claim 1, wherein the third controller uses different threshold values in accordance with a power saving state set out of a plurality of stages.

7. The image forming system according to claim 3, wherein
the image forming unit includes a fixing device that applies heat and pressure at a fixing temperature on the recording medium on a surface of which a toner image is formed, and thereby fixes the toner image on the recording medium,
the third controller is capable of switching a state of the image forming apparatus among a first power saving state where a standby temperature of the fixing device is maintained at a first temperature that is a temperature below the fixing temperature and is set beforehand, a second power saving state where the standby temperature of the fixing device is maintained at a second temperature that is the temperature below the fixing temperature and is set beforehand so as to be higher than the first temperature, and a third power saving state where the standby temperature of the fixing device is maintained at a third temperature that is the temperature below the fixing temperature and is set beforehand so as to be higher than the second temperature, and
the threshold value is set so as to be a highest value at the first power saving state and is set so as to be a lowest value at the third power saving state.

8. An image forming system comprising an image forming apparatus and a terminal device, both of which perform data communication with each other via a network,
the terminal device comprising:
an operation unit that is operated by a user for a purpose of writing input information into a prescribed format;
a first communication unit that performs data communication with the image forming apparatus; and
a first controller that causes the first communication unit to transmit the input information written into the format to the image forming apparatus together with a user identifier to be used to identify the user who has written the input information,
the image forming apparatus comprising:
a third communication unit that performs data communication with the terminal device;
an image forming unit that forms an image on a recording medium;
a storage unit that stores at least one threshold value that is set beforehand for each user identifier; and
a third controller that, when the third communication unit receives the input information written into the format and the user identifier, reads out a threshold value corresponding to the received user identifier from the storage unit, obtains on a basis of the input information written into the format an available capacity that can further write the input information into the format, compares the available capacity with the read out threshold value, and switches the image forming unit from a power saving state to a driving state when the available capacity becomes below the threshold value.

* * * * *